Feb. 18, 1969  C. B. RICHEY  3,428,135
TURNOVER PLOW

Filed March 4, 1966  Sheet 3 of 4

INVENTOR.
CLARENCE B. RICHEY
BY Tweedale & Gerhardt
ATTORNEYS.

United States Patent Office 3,428,135
Patented Feb. 18, 1969

3,428,135
TURNOVER PLOW
Clarence B. Richey, Fresno, Calif., assignor to
Massey-Ferguson Inc., Detroit, Mich.
Filed Mar. 4, 1966, Ser. No. 531,876
U.S. Cl. 172—225                    11 Claims
Int. Cl. A01b 3/40, 3/28

ABSTRACT OF THE DISCLOSURE

A reversible multi-bottom plow has a plow carrier oscillatable through a half revolution about a fore-and-aft axis. The carrier is turned by a hydraulic cylinder having a lost motion connection to the carrier which serves to control engagement and release of latching mechanisms for the carrier.

---

This invention relates generally to earthworking implements and is particularly concerned with two-way plows of the type in which one or more plow bottoms are alternately moved between transport and working positions, or wherein oppositely projecting left and right hand plow bottoms are alternately moved to their working positions.

In accordance with the present invention, a plow frame is carried by a supporting frame for movement between left and right hand plowing positions upon actuation of a power element. The power element is preferably in the form of an extensible and retractable hydraulic ram having one end pivotally mounted on the supporting frame and its other end connected with the plow frame. When the plow frame is in either of its plowing positions the ram is extended. The ram is connected with the plow frame in such a manner that retraction of the ram causes the plow frame to move from one plowing position to an intermediate position between the plowing positions in which it is biased by its weight toward the other plowing position, and subsequent extension of the ram causes the plow frame to move to the other plowing position. Hence, retraction and extension of the ram always causes the plow frame to move from one to the other of the plowing positions.

The plow frame carries a housing having a pair of spaced plates formed with aligned, double keyhole slots, and a pin carried by one end of the ram is received in the slots. As the ram is sequentially retracted and extended, the pin moves to opposite ends of the double keyhole slots as the plow frame moves from one to the other of the plowing positions. Latch members supported on arms projecting in opposite directions from the supporting frame engage the pin as the plow frame assumes the plowing positions to restrain the plow frame against movement from the selected plowing position. Subsequent retraction of the ram releases the latch to permit movement of the plow frame by the ram.

Preferably, the plow frame is rotatable about the axis of an elongate frame member and the ram is pivotally supported on the elongate frame member on an axis spaced from the rotational axis of the plow frame, and when fully retracted, due to the arrangement of the slotted plates, the plow frame is positioned overcenter with respect to the vertical such that its weight tends to carry the frame toward the opposite plowing position from which it moved. The end of the double keyhole slot opposite to the one with which the ram and pin are engaged is positioned overcenter toward the other plowing position so that extension of the ram in effect releases the plow frame and permits it to continue rotating to the other plowing position.

An embodiment of the invention will now be described, by way of example, with reference to the accompanying drawings in which.

Figure 1:
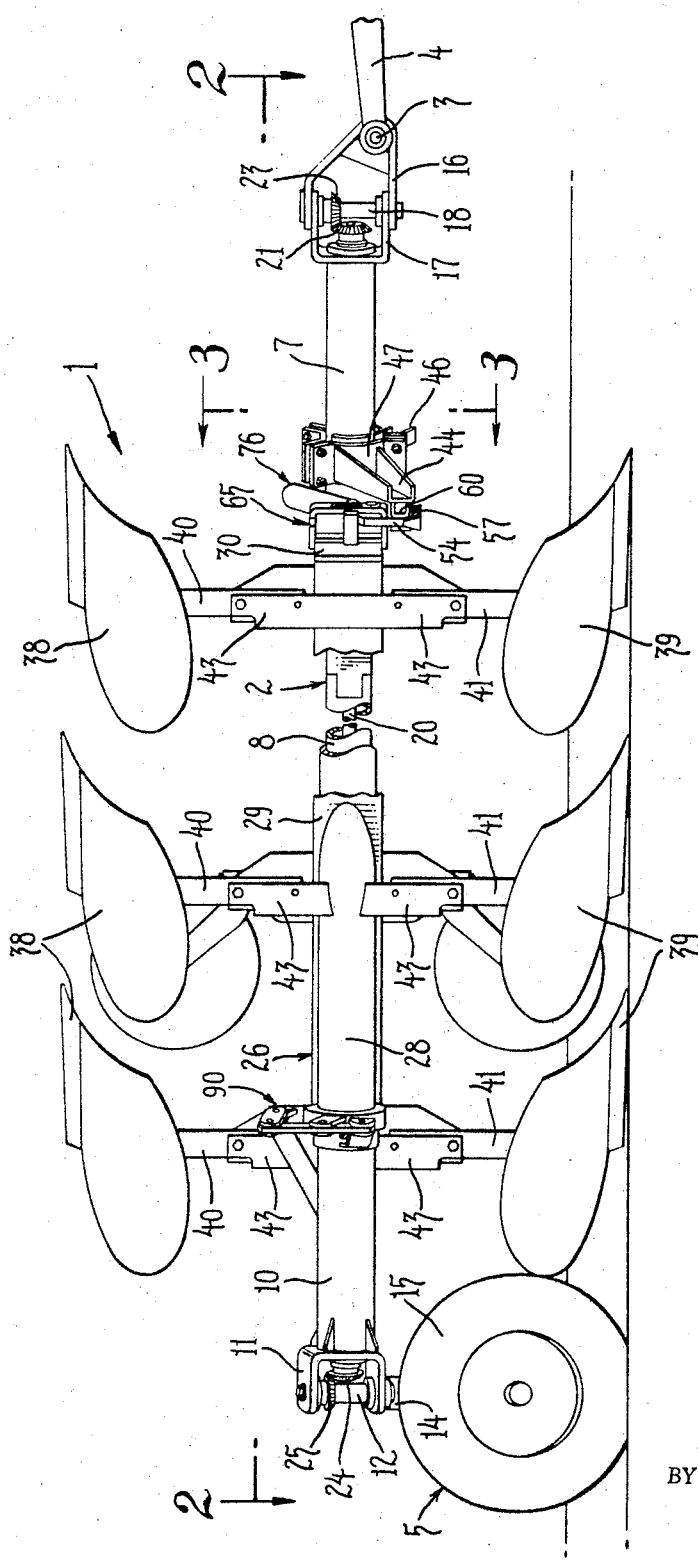
FIG. 1 is an elevational view of a turnover plow embodying the invention in its preferred form.
Figure 2:
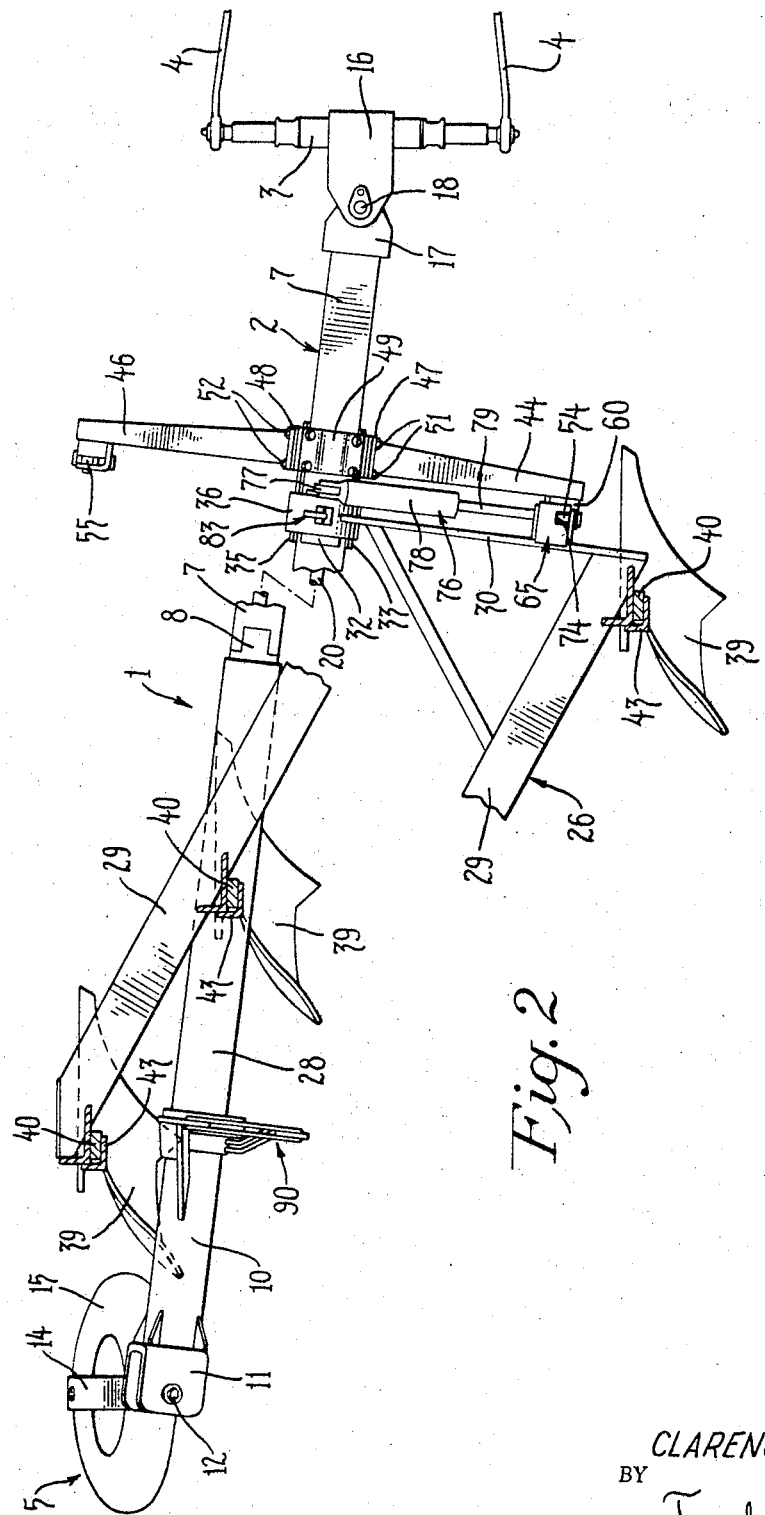
FIG. 2 is a sectional plan view taken on line 2—2 of FIG. 1.

In FIGS. 1 and 2, reference numeral 1 collectively designates a semi-mounted turnover plow including a supporting frame consisting of a main draft frame member 2 having its forward end supported on a cross bar 3 mounted between the trailing ends of the draft links 4 of a tractor (not shown). The rear end of draft frame member 2 is supported on a wheel assembly designated generally by reference numeral 5.

The main frame member 2 in the illustrated embodiment includes a forward section 7 of square or other non-circular cross section, and a rear section 8 of circular cross section. The wheel assembly 5 includes a sleeve 10 rotatably mounted on the circular section 8 of frame member 2, a bracket 11 mounted on the rear end of sleeve 10, a spindle 12 rotatably supported in bracket 11, a wheel support arm 14 secured to the lower end of spindle 12, and a wheel 15 rotatably mounted on the lower end of support arm 14. Rotation of spindle 12 about its longitudinal axis within bracket 11 causes wheel 15 to turn about the axis of spindle 12 and steer the rear end of the implement.

A bracket or frame 16 is mounted on cross bar 3, and the arms of a bracket 17, which is secured to the front section 7 of frame 2, are secured between the arms of frame 16 by a spindle 18. Spindle 18 is non-rotatably mounted on frame 16 such that side to side swinging movement of frame 2 about the axis of spindle 18 does not affect frame 16. Rotatably journalled within the main frame member 2 is a steering control shaft 20 having a beveled pinion gear 21 on its forward end which is engaged with a beveled pinion gear 23 on the stationary spindle 18. A beveled pinion gear 24 is mounted on the rear of shaft 20 and is engaged with a beveled pinion gear 25 on spindle 12. Consequently, any change in the direction of movement of the tractor with respect to the plow causes pinion 21 to move around pinion 23 and cause corresponding rotation of shaft 20, which rotation causes spindle 12 to turn wheel 15 about the axis of spindle 12 in accordance with the change in the direction of the tractor.

Figure 3:
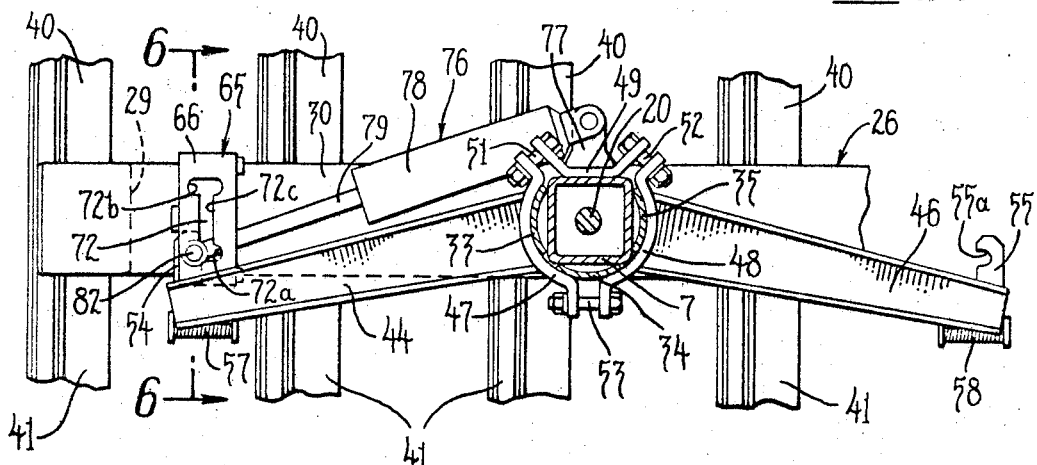
FIG. 3 is a sectional view taken on line 3—3 of FIG. 1.
Figure 4:
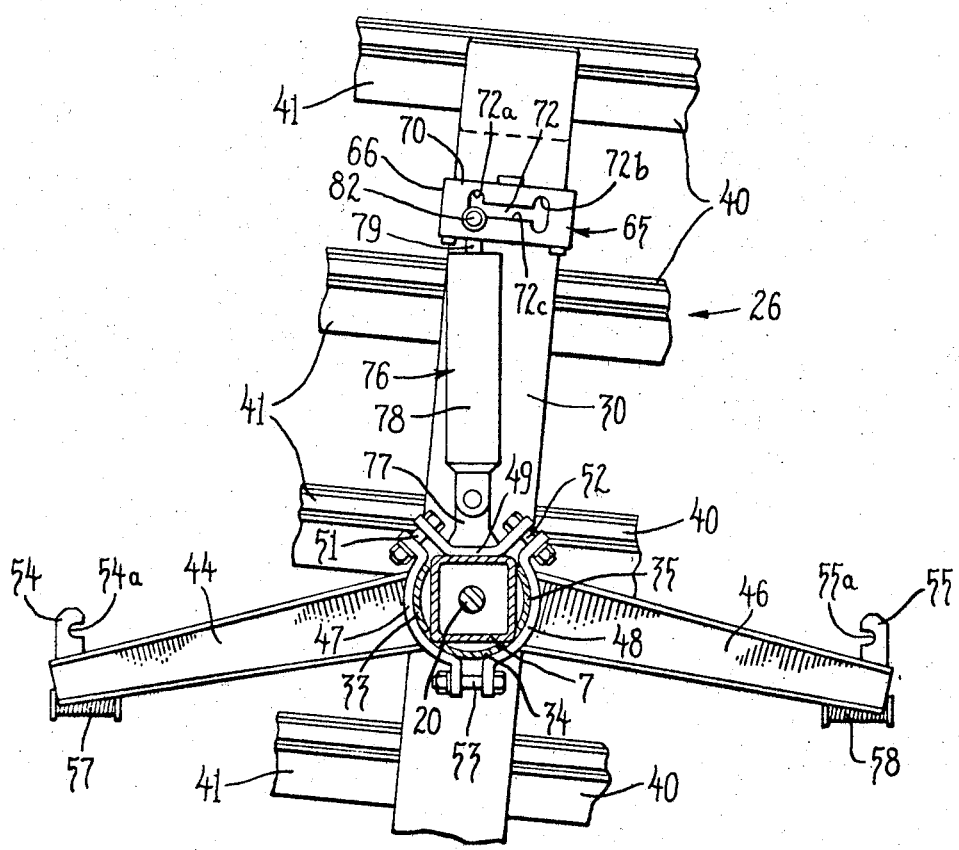
FIG. 4 is a view similar to FIG. 3 with the plow shown in a different position.
Figure 5:
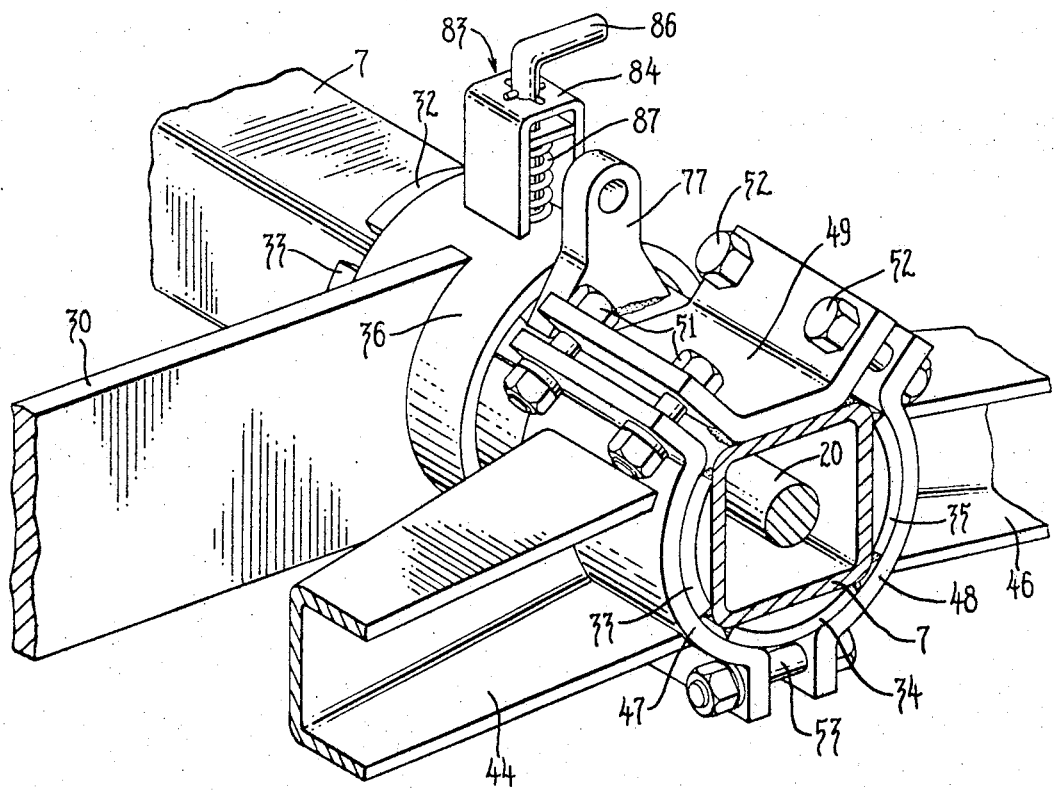
FIG. 5 is a perspective detail view.

Mounted on main frame 2 is a plow frame designated generally by reference numeral 26 and including a sleeve 28 rotatably mounted on the circular section 8 of frame member 2, a diagonal beam 29 secured between its ends to sleeve 28, and a transverse frame member 30 extending from the forward end of the diagonal beam 29 into rotatable connection with the main frame member 2. With reference to FIGS. 3, 4 and 5, a bearing plate assembly is mounted on the square section 7 of frame 2 for rotatably supporting the end of the transverse frame member 30 and includes a top curved bearing plate 32, side bearing plates 33 and 35, and a bottom curved bearing plate 34. Plates 32, 33, 34 and 35 are welded to section 7 to provide a circular bearing surface for a collar 36 secured to the end of the transverse frame member 30. Left and right-hand plow bottoms 38 and 39, respectively, are mounted on oppositely projecting standards 40 and 41, respectively, which are secured to beam 29 or sleeve 28 by plate assemblies 43.

Projecting laterally from main frame 2 just forward of collar 36 and the transverse frame member 30 is a pair of oppositely projecting support arms 44 and 46. The inner ends of arms 44 and 46 are secured to curved mounting plates 47 and 48, respectively, which in turn are connected with a top mounting plate 49 seated against the upper surface of the square section 7 of frame 2. The top mounting plate 49 may be welded or otherwise permanently secured to frame section 7. The top curved bearing plate 32 terminates short of the forward end of bearing plates 33, 34 and 35, and the top mounting plate 49 cooperates with the forward portions of the curved plates 33, 34 and 35 to provide an adjustable mounting for arms 44 and 46. The flanges of plates 47, 48 and 49 are secured together by pairs of clamping bolts 51, 52 and 53. The angular relationship of arms 44 and 46 with respect to the axis of the main frame member 2 can be adjusted by means of bolts 51, 52 and 53. For example, to lower arm 44 in a counterclockwise direction about the axis of beam 2, bolts 51 may be loosened and bolts 53 correspondingly tightened to draw the mounting plate 47 downward.

Figure 6:
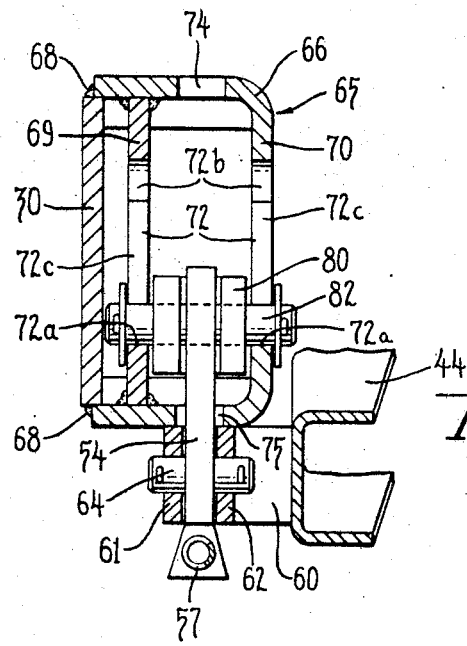
FIG. 6 is a sectional detail view on line 6—6 of FIG. 3.

Pivotally mounted on the end of arm 44 is a latch 54 which is biased in a clockwise direction as viewed in FIG. 4 by a spring 57. A similar latch 55 and spring 58 are mounted on arm 46. With reference to FIG. 6, latch 54 is pivotally mounted on a bracket 60 between a pair of plates 61 and 62 by a pivot pin 64. Spring 57 is in compression and biases latch 54 inwardly about the axis of pin 64 toward draft frame 2. The construction and mounting of latches 54 and 55 are identical except for being left and right hand opposites.

Carried by frame member 30 is a locking assembly 65 including a housing 66 of reversed C-shape as viewed in FIG. 6 which is welded at 68 to the transverse frame member 30. Mounted between the upper and lower horizontal walls of housing 66 is a plate 69 which cooperates with the vertical wall or side plate 70 of housing 66 to form an enclosure for the latches 54 and 55. Aligned double keyhole slots 72 are formed in plates 69 and 70, respectively. Slots 72 are formed with transverse end portions 72a and 72b connected by an elongated portion 72c. Slots 74 and 75 are formed in the upper and lower horizontal portions, respectively, of housing member 66 for receiving latches 55 and 54, respectively. When the plow bottoms are in the position shown in FIG. 3, latch 54 projects through the slot 75 into the space between plates 69 and 70.

The plow frame 26 is caused to turn about the longitudinal axis of main frame member 2 by a hydraulic ram 76, the cylinder 78 of which is pivotally connected to a support arm 77 fixed to the top wall of section 7 of frame member 2 between the curved plate 32 and the top mounting plate 49 (FIG. 5). The piston rod 79 of ram 76 has its ends received between plates 69 and 70 of the latch assembly 65 and is slideably engaged with slots 72 by a pin 82 mounted transversely in a clevis 80 carried by the end of the piston rod. When the plow frame is in the position shown in FIGS. 1, 2 and 3, ram 76 is extended until pin 82 is seated against the left-hand edges of the lower transverse portions 72a of slots 72. The notch 54a of latch 54 is biased by spring 57 into engagement with pin 82 to prevent movement of plow frame 26 relative to arm 44. In this position plows 39 are in their working position for right-hand plowing.

To rotate the plow frame about the axis of draft frame member 2, the ram is retracted which causes pin 82 to first disengage from latch 54 and then to engage the right-hand edges of the portions 72a of slots 72 and further retraction of ram 76 causes the plow frame to turn in a clockwise direction from the position of FIG. 3 to the position of FIG. 4 in which the piston 79 is fully retracted with pin 82 engaged against the lower edges of slot portions 72a. The frame member 30, as shown in FIG. 4, has moved past the vertical such that the plows 38 are positioned lower than the plows 39 and the weight of the plows tends to cause the frame 26 to continue rotating in a clockwise direction about frame member 2.

As the ram 76 is extended from the position shown in FIG. 4, frame member 30 rotates toward arm 46 due to the weight of the plows, and pin 82 extends outwardly to engage the elongated portion 72c of slot 72 until latch 55 is received in slot 74 (FIG. 6). Pin 82 falls to the transverse portion 72b of slot 72 and engages the notch 55a of latch 55. When pin 82 is received in either of the bottom edges of the transverse portions 72a or 72b as viewed in FIG. 4, the top frame will be overcenter and tend to move toward one or the other of the operating positions. For example, in the position shown in FIG. 4 with pin 82 held by the ram against the lower edge of the portion 72a, the weight of the plow will tend to carry the frame in a clockwise direction. Conversely, when pin 82 is received in groove 72b and ram 76 is retracted, the weight of the plows will tend to rotate the frame in a counterclockwise direction as viewed in FIG. 4.

Mounted on collar 36 is a transport latch assembly 83 (FIG. 5) for locking the plow frame in a transport position such that the standards 40 and 41 project horizontally in opposite directions from the center of frame member 2. The latch assembly 83 includes an inverted U-shaped support bracket 84 mounted on collar 36, a plunger 86, and spring 87. A locking hole may be provided in the curved plate 35 such that when the plow frame is rotated 90 degrees from the position shown in FIGS. 3 and 5, plunger 86 can be brought into alignment with the hole. Rotation of the plunger 86 90 degrees about the axis of spring 87 permits the plunger to extend into the hole to lock the frame in its transport position.

With reference to FIG. 1, sleeve 28 of the plow frame is interconnected with sleeve 10 of the wheel assembly by a tilting mechanism 90 which operates to sequentially rotate the wheel assembly 5 about the longitudinal axis of main frame 2 between a tilted left hand furrow wheel position, an upright transport position, and a tilted, right hand furrow wheel position in response to movement of the plow frame to its left hand plowing position, transport position, and right hand plowing position, respectively. The construction and operation of mechanism 90 is fully described in my copending U.S. application Ser. Number 524,191, filed Feb. 1, 1966, entitled, "Semi-Mounted Earthworking Implement," and the entire disclosure of which is incorporated herein by reference.

Thus, when the plow frame is in the right hand plowing position as shown in FIG. 1, wheel 15 is tilted in a direction to resist the side forces acting on plow bottoms 39. Upon retraction of the arm or power element 76 from the position shown in FIGS. 1, 2 and 3, mechanism 90 causes wheel assembly 5 to rotate about the longitudinal axis of main frame 2. When the plow frame is in its transport position midway between the plowing positions with plow bottoms 39 and 38 projecting laterally on opposite sides of main frame 2, wheel 15 is in a substantially vertical position. Consequently, when the plunger 86 is released by rotation 90 degrees from its FIG. 5 position, it engages a locking hole in plate 35 when the transverse frame 30 is in a dead center or vertical position between arms 44 and 46 to stop rotation of the plow frame at the transport position. If the plunger is in its inoperative or restrained position as shown in FIG. 5, it cannot engage the locking hole and the plow frame moves past the transport position to the position shown in FIG. 4. When the plow frame is rotated from the position of FIG. 4 to move plow bottoms 38 into their plowing position upon extension of ram 76, the wheel 15 is tilted in the opposite direction from that shown in FIG. 2 to resist the side forces acting on the left hand plow bottoms 38.

While a specific embodiment of the invention has been illustrated and described in the foregoing specification, it should be understood that the invention is not limited to the exact construction shown. On the contrary, various modifications and alterations in the construction and arrangement of parts, as well as numerous equivalents, will be apparent to those skilled in the art without departing from the scope and spirit of the invention.

What is claimed is:

1. A two-way turnover plow comprising a supporting frame, a plow frame mounted on the supporting frame for movement between opposite left and right hand plowing positions, an extensible and retractable power element on said supporting frame, and lost motion means connecting said power element with the plow frame operable to cause the plow frame to move from one of said plowing positions when the power element is actuated in one direction to a position intermediate the plowing positions in which it is biased by its weight to move from said intermediate position to the other of the plowing positions when the power element is actuated in the opposite direction such that sequential actuation of the power element always moves the plow frame from one to the other of the plowing positions and latching mechanism operable to hold the plow frame in either of its plowing positions and associated with the lost motion connecting means for releasing action by the initial operation of the power element.

2. A two-way turnover plow comprising a supporting frame, a plow frame mounted on the supporting frame for movement between opposite left and right hand plowing positions, an extensible and retractable power element on said supporting frame, and means connecting said power element with the plow frame operable to cause the plow frame to move to one of said plowing positions when the power element is actuated in one direction to a position intermediate the plowing positions in which it is biased by its weight to move from said intermediate position to the other of the plowing positions when the power element is actuated in the opposite direction such that sequential actuation of the power element always moves the plow frame from one to the other of the plowing positions, said connecting means including a plate carried by the plow frame having a slot formed therein with an elongated central portion and a pair of enlarged end portions and a pin carried by one end of said power element and engaged in said slot, the central portion of said slot being disposed substantially vertically when the plow frame is in one of the plowing positions with said pin engaged with the lower one of the enlarged end portions, and the slot moving to an inverted position and said pin moving to the other enlarged end portion as the plow frame moves to the other plowing positions upon sequential retraction and extension of the power element.

3. A two-way turnover plow as claimed in claim 2 wherein the central portion of said slot is disposed horizontally when the plow frame is at the midpoint between said plowing positions, and the engagement of said pin with said one enlarged end portion of the slot causes said plow frame to move from said one plowing position past said midpoint to said intermediate position upon full retraction of the power element, and subsequent extension of said power element causes said pin to move from said one enlarged end portion along the central portion of said slot to the other of said enlarged end portions as the plow frame moves into the other plowing position.

4. A two-way turnover plow as claimed in claim 3 further including a pair of oppositely projecting support arms on said supporting frame each having a latch near the end thereof, and wherein said pin is moved into engagement with each latch by said power element as the plow frame moves into the plowing position associated with said latch, and is moved out of engagement with said latch by retraction of the power element.

5. A two-way turnover plow comprising a supporting frame, a plow frame mounted on the supporting frame for movement between opposite left and right hand plowing positions, an extensible and retractable power element on said supporting frame, and means connecting said power element with the plow frame operable to cause the plow frame to move to one of said plowing positions when the power element is actuated in one direction to a position intermediate the plowing positions in which it is biased by its weight to move from said intermediate position to the other of the plowing positions when the power element is actuated in the opposite direction such that sequential actuation of the power element always moves the plow frame from one to the other of the plowing positions, including an elongated main frame member having a pair of transverse support arms projecting laterally in opposite directions therefrom, and wherein said plow frame is rotatably mounted on said main frame member and includes a transverse frame member having one end mounted for rotation about the longitudinal axis of said main frame member, and wherein said connecting means comprises a locking assembly including a housing on said transverse frame member having a pair of end plates connected by a pair of spaced side plates, aligned slots formed in said side plates having a central elongated portion and enlarged end portions, a pin carried by one end of said power element and received between said side plates in engagement with said slots, and further including a latch on each of said laterally projecting support arms, notches in said end plates for alternately receiving said latches between said side plates when the plow frame moves from one to the other of its plowing positions, said latches each being engageable with said pin when the pin is in the lower one of the end portions of the slots and the plow frame is in the associated plowing position, and retraction of said power element causing said pin to disengage from the latch and rotate the plow frame overcenter to said intermediate position such that subsequent extension of the power element causes the pin to disengage from said one end portions and move along the central portions of the slots to the other end portions thereof as the plow moves into the other plowing position, said slots moving to an inverted position as the plow frame moves from one to the other of the plowing positions.

6. A two-way turnover plow as claimed in claim 5 wherein a portion of said main frame member is of non-circular cross-section and further including a top mounting plate secured to the upper surface of the non-circular portion and curved bearing plates secured to each of the remaining surfaces to define a circular bearing surface around said remaining surfaces, a complementary curved mounting plate on the inner end of each of said support arms each having a pair of side flanges, one of which is adjustably secured to opposite sides of the top mounting plate and the other of which is adjustably secured to the other flange of the mounting plate on the other support arm to permit selective angular adjustment of the support arms about the longitudinal axis of the main frame member.

7. An earthworking implement comprising a supporting frame, a tool carrying frame mounted on the supporting frame for movement between operative and inoperative positions relative to the supporting frame, inter-engageable locking elements carried by the supporting and tool carrying frames operable when engaged to restrain the tool carrying frame in an operative position against movement relative to the supporting frame, and power means mounted on the supporting frame and connected with the tool carrying frame and the locking element carried thereby selectively operable to sequentially unlock said locking elements and move the tool carrying frame relative to the supporting frame from the operative position in which it is held by said locking elements, and to sequentially move the tool carrying frame from inoperative to operative positions and lock said locking elements, including an elongated main frame member and the tool carrying frame is rotatable about the longitudinal axis of the main frame member; said inter-engageable locking elements include a latch carried by the supporting frame at a point spaced from the main frame member, and a locking plate carried by the tool carrying frame; and said power means comprises an extensible and retractable hydraulic ram having one end mounted on the main frame member and its other end supported in said locking plate such that extension of the ram causes the tool carrying frame to move to an operative position and said other end of the ram to engage the latch to lock the tool carrying frame against movement relative to the supporting frame, and subsequent retraction of the ram sequentially causes said other end of the ram to move out of engagement with the latch to release the tool carrying frame and thereafter rotate the tool carrying frame out of the operative position.

8. An earthworking implement as claimed in claim 7 wherein said tool carrying frame is held in an inoperative position when the ram is retracted and is biased by its weight to move toward an operative position.

9. An earthworking implement as claimed in claim 8 wherein said interengageable locking elements include a latch mounted on the supporting frame and means on the tool carrying frame defining a slot; and wherein said power means includes a movable member continuously slideably supported in said slot such that movement of said movable member in one direction when the tool carrying frame is in an inoperative position causes the tool carrying frame to move to an operative position and bring said slot into juxtaposition with the latch and said movable member into engagement with the latch, and subsequent movement of said movable member in the opposite direction causes said movable member to disengage from said latch and move the tool carrying frame from its operative position.

10. An earthworking implement as claimed in claim 9 wherein said power means comprises an extensible and retractable hydraulic ram the piston of which comprises said movable member, said ram being extended when the tool carrying frame is in an operative position, and said tool carrying frame is in an inoperative position when the ram is retracted and the weight of the tool carrying frame biases the tool carrying frame to move to a second operative position.

11. An earthworking implement as claimed in claim 10 further including cooperable transport locking means on said supporting and tool carrying frames engageable to lock said tool carrying frame in a transport position with respect to said supporting frame, releasable means for normally restraining said transport locking means against engagement, and wherein retraction of said ram moves said tool carrying frame past said transport position when said transport locking means is restrained, and wherein said tool carrying frame moves to said transport position only and is locked therein by said transport locking means upon retraction of the ram when said transport locking means is released.

References Cited

UNITED STATES PATENTS 3,311,176   3/1967   Clelano _____ 172—225

FOREIGN PATENTS 661,245   3/1929   France.
1,164,355   5/1958   France.

ABRAHAM G. STONE, *Primary Examiner.*

J. W. PETERSON, *Assistant Examiner.*